SHIFTABLE MOUNTING MEANS FOR TRANSDUCERS

Filed Nov. 2, 1964

INVENTORS
LEO W. PAGE
THOMAS A. EMERY
BY LEWIS C. SOWERS
Price & Heneveld
ATTORNEYS INVENTORS
LEO W. PAGE
THOMAS A. EMERY
LEWIS C. SOWERS
BY
Price & Heneveld
ATTORNEYS United States Patent Office 3,440,359

Patented Apr. 22, 1969

3,440,359

SHIFTABLE MOUNTING MEANS FOR TRANSDUCERS

Leo W. Page, Potterville, and Thomas A. Emery and Lewis C. Sowers, Charlotte, Mich., assignors, by mesne assignments, to VSI Corporation, Pasadena, Calif., a corporation of Illinois Filed Nov. 2, 1964, Ser. No. 408,099

Int. Cl. G11b 5/56

U.S. Cl. 179—100.2 5 Claims

ABSTRACT OF THE DISCLOSURE

Apparatus for mounting transducer heads in multiple channel type recording systems, wherein the mounting block is provided having a recess in which the transducing head is located. Adjustment means is associated with the mounting block for adjusting the azimuth of the head relative to the block and means is provided for moving the entire block so as to adjust the head for picking up different channels on the tape.

This invention relates to multiple-channel tape recording systems, and more particularly to a novel apparatus for effectively multiplying the number of channels available for recording information upon a single tape.

Originally, tape recorders utilized only a single channel on each tape for recording and reproducing information-bearing audio signals. In such systems, the tape travelled past the recording head in a single fixed relationship, in which the pole piece of the recording head was always aligned with one predetermined area of the tape. This one area constituted the single information channel. It soon developed that a single tape could provide a pair of information channels just as well as the previous single channel. Such a pair of channels could be produced by aligning the reproducing head pole piece a given distance off the center-line of the tape. Consequently, when the tape was inverted by interchanging the reels upon their guides, the pole piece would then be aligned with the previously unused portion of the tape on the other side of the center-line.

With the rapid development of binaural or stereo recording and reproduction, recording heads were developed which had a pair of independent pole pieces, each of which would record or replay one of the two stereo channels. The method of inverting the tape to double the number of available channels which had been previously developed was soon applied to stereo recording techniques. Accordingly, each of the two independent pole pieces in the reproducing head were offset a distance from the center-line of the tape, and in this case inversion of the tape resulted in the availability of four information channels on each tape, i.e., one channel for each position of each pole piece, or two separate pairs of stereo channels. Each of these four channels became known in the art as quarter-tracks.

Although it has been possible for some time to produce recorder heads whose pole pieces are physically small enough to require less than one eighth of the width of the tape to record a channel of information, "eighth track" tape recording and reproduction to my knowledge has never been conceived, and has never been made available.

It is the primary object of the present invention to provide a multiple-channel tape recording system which effectively multiplies the existing number of usable recording channels to whatever extent may be deemed desirable or practicable, and which successfully resolves the previously-existing problems which have heretofore prevented such a system from coming into existence.

Another object of the present invention is to provide a multiple-channel tape recording system having a simple manually operable control for changing the position of the recording head pole pieces relative to the tape in fixed, predetermined incremental steps, thereby selecting different channels.

A further object of this invention is to provide a simple means for modifying an existing recorder to increase its number of channels.

Additional objects of the present invention are to provide a multiple-channel tape recording system having a unique means for mounting the recording head in a rigid and unchanging attitude relative to the tape, which mounting means permits the repositioning of the head for the selection of additional channels, and which also includes adjustment means for adjusting the angular relationship or azimuth of the pole pieces relative to all of the channels on the tape.

These and other objects of the invention, together with additional desirable advantages resulting from its usage, will become increasingly apparent after contemplating the following specification and its appended claims, when taken in conjunction with the accompanying illustrative drawings setting forth a preferred embodiment of the inventive system.

The multiple-channel recording system of the present invention is based upon the concept of a movable recording head which may by actuation of a manually operable control mechanism be positioned at a plurality of different predetermined fixed points across the width of the recording tape, thereby producing a plurality of discrete and separate information channels upon the tape at these points. The control mechanism holds the recording head firmly in place, so that its attitude, particularly in azimuth, relative to the tape is completely fixed and does not vary between any two channels or during the selection of a particular channel. Thus, the pole piece in the recording head cannot inadvertently become misaligned with the desired channel or drift onto any other closely adjacent channel, which might result in distortion of the desired channel, cross talk between the two channels, or even the accidental erasure of information from an adjacent channel. Moreover, the recording head is retained in this position by a unique mechanism which is adjustable, and which permits the head to be pivoted about a predetermined point, thereby adjusting the angular relationship or attitude of the pole pieces relative to the predetermined channel positions on a tape. In this manner, completely accurate positioning of the poles pieces relative to the channel positions on the tape is insured. The present unique recording system is completely compatible with existing systems which use the method of inverting the tape to provide four tracks or channels, or it may be used independently of the other system, in which case it obviates the necessity of inverting the tape, while continuing to provide as many different channels of information as the recording head is capable of producing.

Figure 1:
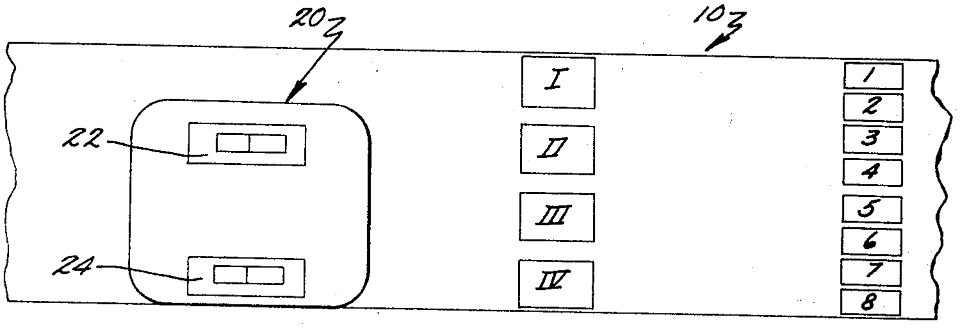
FIG. 1 is a pictorial representation showing the relative alignment of information channels and recording head pole pieces.

Referring now in more detail to the drawings, in FIG. 1 an illustrative segment of recording tape 10 is depicted. Upon the tape 10 are rectangles designated I, II, III, and IV, whose width indicates the relative positions across the tape of the information channels of present four-track recording systems. The tape 10 in this figure also has rectangles designated 1 through 8, whose width indicates the relative positions across the tape of the eight information channels made possible by the present invention. A typical recording head 20 is shown in the position which it normally occupies relative to the tape 10. The recording head 20 has pole pieces 22 and 24 by which magnetic recording or reproduction is accomplished, and these pole pieces are shown in alignment with channels II and IV of the four-track system illustrated.

Figure 2:
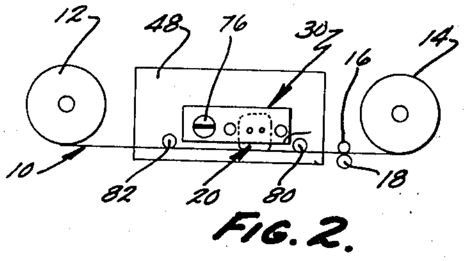
FIG. 2 is a schematic plan view of the recording mechanism of this invention.

The schematic plan view of FIG. 2 depicts a preferred manner in which the tape 10 of FIG. 1 may be mounted and driven past the recording head 20. The tape is wound upon a pair of typical reels 12 and 14, which serve to take up and pay off quantities thereof. The reproducing head 20 is secured within a mounting block 30 which in turn rests upon a support platform 48, all in a manner described subsequently in great detail. Tape guides 80 and 82 position the tape 10 accurately before the head 20, and the tape is driven past the head in this position. A capstan 16 and pinch-roller or puck 18 serve to drive the tape, the pinch-roller preferably being spring-loaded toward the capstan so as to "pinch" the tape therebetween, and being driven in a rotary manner by conventional driving means, as is known in the art.

Figure 3:
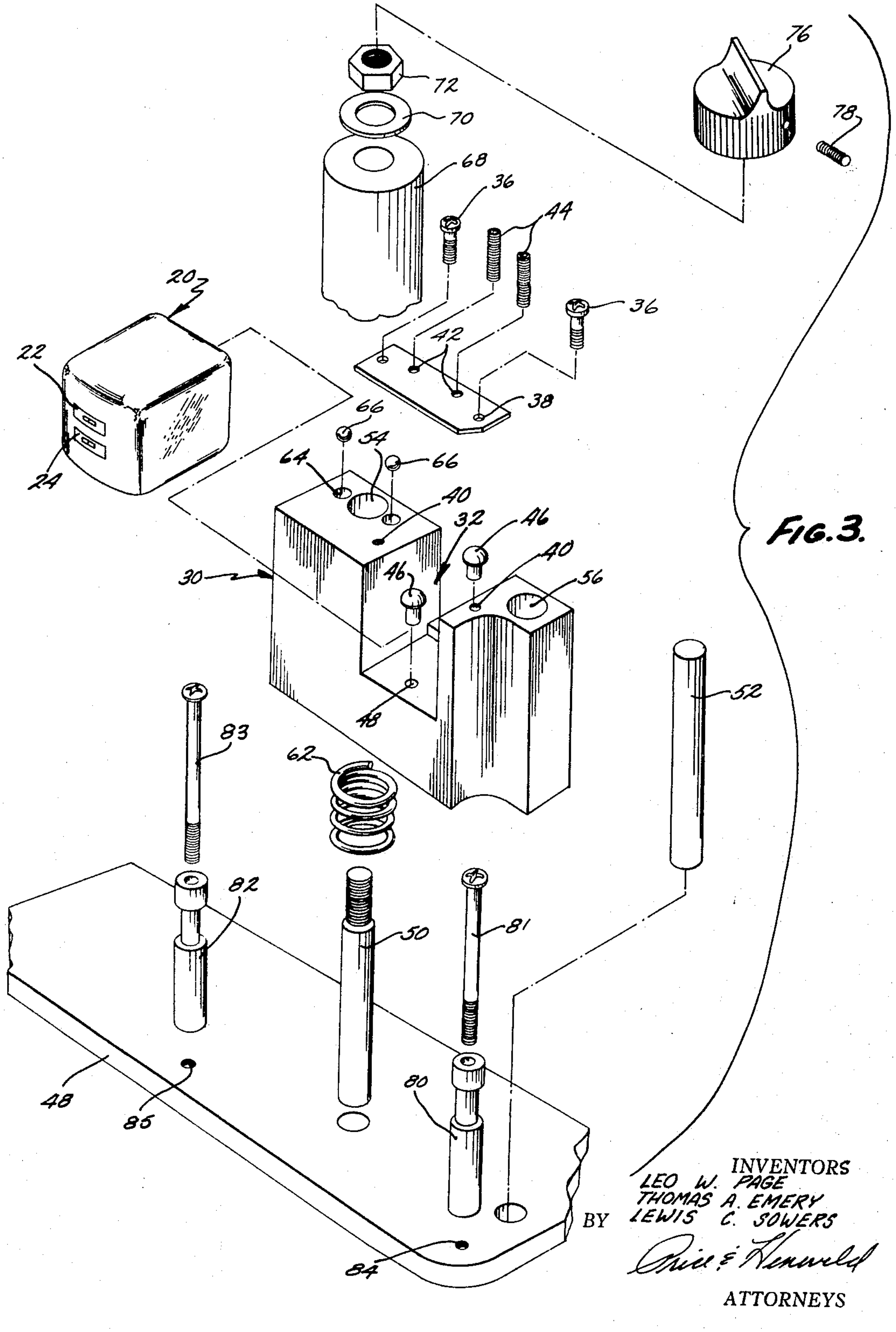
FIG. 3 is an exploded perspective view of a unique preferred mounting apparatus for accomplishing the system.

In FIG. 3 the complete mechanism for mounting the recording head 20 is shown in exploded form. The heart of this mechanism is a mounting block 30 having a generally U-shaped configuration with a central opening 32. This opening is for the purpose of receiving the recording and reproducing head 20 with a small amount of clearance between the sides of the two. The head 20 is retained in place within opening 32 by means of a substantially rigid plate member 34, which spans opening 32 and rests upon the upturned leg portions of U-shaped block 30. The plate 34 is secured in place upon block 30 by a pair of screws 36, which pass through an appropriate pair of holes 38 drilled in the strap and thread into tapped holes 40 in the legs of the block.

It should be noted that (as shown in FIG. 3), plate 34 does not contact the top of head 20. Instead, a pair of tapped holes 42 are formed through the plate, and a pair of threaded adjustment screws 44 are threaded into holes 42 and through the plate, until they contact the top of head 20 a distance below the bottom surface of plate 34. Thus, it is adjusting screws 44 which retain the head 20 in place upon block 30, not plate 34.

It should also be noted that the bottom of head 20 does not rest directly upon the bottom surface of opening 32 in block 30. Instead, a pair of generally round-headed rivets or screws 46 are inserted into appropriate holes 48 drilled in a transverse line across the bottom surface of opening 32, approximately at its center. It is upon the rounded heads of rivets 46 that the bottom of reproducing head 20 rests, as seen best in FIG. 3. Thus, these rounded heads form a pivot point about which the head 20 may be gradually rotated in either direction by adjustment of screws 44 which are in contact with the top of the head. It will readily be appreciated that this arrangement holds reproducing head 20 securely and immovably in place, since normally there is little or no load upon the head during recording or reproducing operations, and the adjustment screws 44 exert considerable retaining pressure against the head 20. Futhermore, very accurate positioning of pole pieces 22 and 24 of the head 20 may be obtained by loosening one of the screws 44 slightly while tightening the other, which moves the entire head about the pivot point provided by rivets 46.

Figure 4:
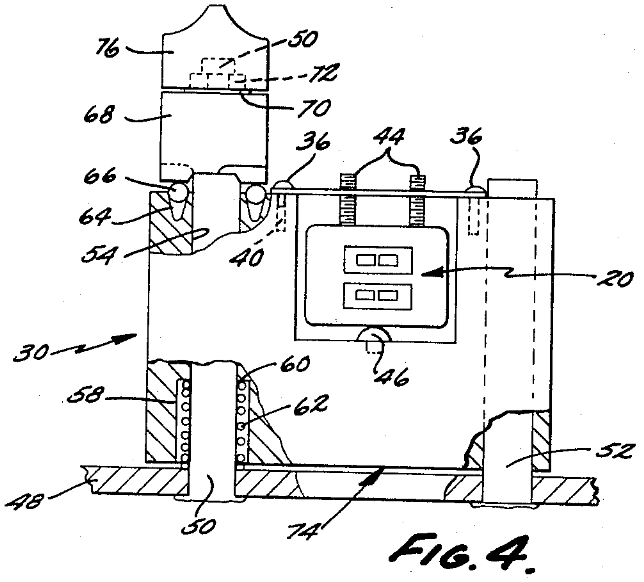
FIG. 4 is a front elevational view of the assembled mounting apparatus of FIG. 3.

Mounting block 30 is installed upon a supporting surface such as platform 48 of FIGS. 3 and 4. The position of the mounting block relative to support platform 48 is maintained by a pair of elongate guide pins 50 and 52, which attach to the support in a rigid and secure manner by conventional means such as threading or the like. Guide pins 50 and 52 pass through suitable elongate guideway openings 54 and 56, respectively, formed through the upturned legs of block 30. The openings 54 and 56 are formed so as to provide a close slip fit with guide pins 50 and 52. This permits block 30 to be slid upward upon the guide pins and moved away from platform 48 in a vertical direction, while at the same time preventing any horizontal or cocking motion from occurring between these two members.

The lowermost extremity of guideway 54 is enlarged somewhat to form a chamber 58 (best shown in FIG. 4) having a shoulder portion 60 at the point where the different diameters adjoin. A coil spring 62 or other similar resilient biasing means is inserted over guide pin 50 and rests upon the upper surface of support platform 48. When mounting block 30 is placed upon the platform, with guide pin 50 passing through guideway 54 and guide pin 52 passing through guideway 56, the spring 62 is positioned within chamber 58, with its upper extremity engaging shoulder 60. Consequently, the spring supports the weight of the mounting block 30 and all of its associated members, as is shown best in FIG. 4. The spring 62 is of a length sufficient to support block 30 a distance above support platform 48, for purposes discussed subsequently in greater detail.

In FIG. 4 it will be further noted that a pair of conical chambers 64 are formed in the upturned leg of U-shaped block 30 which is at the left in the figure. The two chambers 64 are at either side of, and approximately parallel with guideway 54, also formed in this leg of the block. These openings or chambers are for the purpose of receiving and supporting a pair of ball members 66 such that when each ball is firmly seated against the converging walls of the openings, the upper portion of each ball protrudes slightly out of its opening and above the top surface of mounting block 30, in a manner shown in FIG. 4. With the balls 66 in this position, the upper portion of guide pin 50 protrudees upward out of the block midway between the two protruding balls 66.

Figure 5:
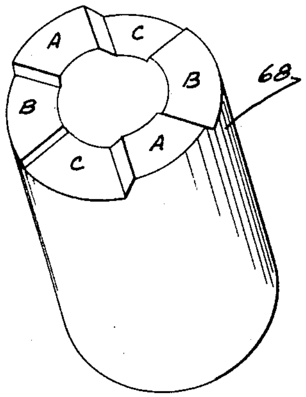
FIG. 5 is a perspective view of a portion of the manual positioning mechanism.

A cam member 68 which is preferably in the general form of a cylinder having a longitudinal opening through its center is placed over the protruding portion of guide pin 50, so that the bottom of the cam rests upon the protruding portion of each of the balls 66, best seen in FIG. 4. The nature of the cam 68 is more clearly seen in FIG. 5. It is here seen that the end of the cam which engages and rests upon ball members 66 has a series of lands or flats formed upon it which are at varying heights from the opposite end of the cam. These flats are arranged in pairs designated A—A, B—B, and C—C, with each member of each pair being disposed diametrically opposite from the other across the end of the cam. As FIG. 5 shows, each of the flats in a pair are the same distance or height from the opposite end of the cam. For purposes to be explained subsequently, the illustrative cam shown in the drawing has three such pairs of flats, although it will be seen that other numbers in other combinations of heights might readily be placed thereupon. Between each two adjacent flats of different height about the end of the cam a ramp is formed, which preferably is at a 45° angle relative to the flat surfaces which it serves to connect.

With the cam 68 in place upon guide pin 50 (FIG. 4), one of the oppositely-disposed pairs of flats will rest upon the top portion of the two ball members 66. In this position, guide pin 50 passes entirely through the cam, and protrudes a distance above its flat upper surface. The extremity of guide pin 50 protruding above the cam is threaded, as was seen in FIG. 3. A washer 70 is inserted over the top of the guide pin, and a nut 72 is threaded upon the pin. As the nut 72 is drawn tight, it forces the cam 68 downward against ball members 66, and thus the cam and mounting block are pushed downward upon the two guide pins against the oppositely directed urgings of spring 62. In this manner, a desired clearance 74 may be accurately established between the top of support platform 48 and the bottom of mounting block 30 for the particular pair of flats engaged upon ball members 66. Finally, an appropriate knob 76 (FIGS. 3 and 4) is installed over the protruding end of guide pin 50 and upon the upper extremity of cam 68, such as by a set scerw 78, such that a turn of the knob 76 results in a similar turn of the cam 68. By such a turn, the cam may be manually repositioned so that a different pair of its flats are moved into position against the upper extremity of ball members 68.

As shown in FIG. 3, a pair of tape guides 80 and 82 are also installed upon support platform 48, as by means of screw members 81 and 83, respectively, which pass through the center of each guide and are threaded into tapped holes 84 and 85, respectively, in the top of the platform. The tape guides 80 and 82 are of a conventional nature, such as the generally cylindrical members shown in the drawing. These guides have a relieved portion of reduced diameter which is approximately the same width as that of the tape to be used. The tape is received within the relieved portion and is guided thereby as it is transferred from one tape reel to another (not shown) and moved across pole pieces 22 and 24 of reproducing head 20 during the operation of the recording apparatus.

Having now completely described the structure of my unique tape recording apparatus, its manner of operation will briefly be described.

By the use of such tape guiding means as the cylindrical guides 80 and 82, the magnetic tape always occupies the same position relative to support platform 48, regardless of the direction in which it is driven. Thus, if the head 20 is positioned as shown in FIG. 1 relative to the tape 10, pole piece 22 will record or reproduce information from quater-track channel II, while pole piece 24 will record or reproduce information from quarter-track channel IV. If the tape now is inverted by interchanging the reels, pole piece 22 will then monitor channel III, while pole piece 24 will monitor channel I, since the tape will be located in the same relative position as before as regards the head 20. This is the present manner in which four tracks are obtained from a single tape, and in connection with the present system, it may be assumed that one of the three pairs of flats on cam 68 are in contact with ball members 66 during this manner of operation.

Now, if control knob 76 is turned such that cam 68 is repositioned upon ball members 66, the other two pairs of cam flats will vary the effective height of the cam. This causes a repositioning of mounting block 30 to a new vertical position relative to the tape 10 and support platform 48. The position of the head is changed by a predetermined amount, i.e., the difference in height between the first and second pairs of cam flats. Since there is a close slip fit between guideways 54 and 56 formed in block 30 and guide pin 50 and 52 which are inserted into these guideways, there will be no rocking or cocking of either the mounting block or the head mounted therein. Instead, the head and its pole pieces will be smoothly translated upon the 45° ramp to a new vertical position relative to the tape, which is constrained by tape guides 80 and 82 to occupy exactly the same position relative to the support platform 48 as it did before the mounting block and head were moved.

Changing the height of mounting block 30 and recording head 20 relative to the tape repositions pole pieces 22 and 24, and aligns them with a pair of the eighth-track channels shown in FIG. 1, for instance channels 4 and 8. Thus, when the tape reels are now interchanged and the tape inverted, pole pieces 22 and 24 will be aligned with eighth-track channels 1 and 5, in the same manner that the quarter-track channels were interchanged, described above. Again, if control knob 76 be turned so that the third pair of cam flats become engaged with ball members 66 and the head 20 is repositioned again relative to the tape, pole pieces 22 and 24 will also be repositioned and will become aligned with eighth-track channels 3 and 7. If the tape reels are now interchanged and the tape consequently inverted, pole pieces 22 and 24 will then become aligned with eighth-track channels 6 and 2, respectively.

It should now be readily apparent that the present inventive tape recording system has multiplied the number of available information channels on conventionally available recording tape. It has done so by a unique apparatus for repositioning the recording head relative to the tape, in addition to the conventional method of inverting the tape by interchanging the tape reels. The head-repositioning apparatus provides absolutely accurate alignment of the pole pieces with the tape channels, and thereby avoids all the possible complications that occur when the tape and the pole pieces are not maintained in strict alignment with each other. The positioning structure is simple nonetheless, and indeed its very simplicity augments and enhances the invention, since it may economically be produced and it requires little or no maintenance. Furthermore, it may easily be installed upon existing quarter-track systems, and it does not require the user to invest in an entirely new system.

The spirit of this invention and the inventive concept underlying it are capable of being embodied within apparatus having different structural details than the preferred version described therein, but such changes in detail as embody the concepts I have disclosed are deemed by me to be a part of my invention, unless the claims appended below by their express language state otherwise.

We claim:

1. Apparatus for mounting transducing head on a support member in multiple-channel tape recording systems, comprising: a mounting block for rigidly carrying said transducing head; adjustment means associated with said mounting block for adjusting the azimuth of said head relative to said block; at least one guide opening extending through said block; guide means received in each such opening permitting adjustment of said block therealong but preventing undesired motions of said block and head tending to change said azimuth; and means for moving said block upon said guide means such that said head is moved to a new position relative to the recording tape, said means including a resilient biasing member located to act between said support and block, and a rotatable stepped cam mounted on said guide means on the opposite side of said block from said biasing member and in alignment therewith; and a cam follower means on said opposite side of said block engaging said cam whereby rotating of said cam adjusts the position of said block.

2. The apparatus of claim 1 in which a recess is provided in said mounting block for receiving a transducing head; a pivot-forming projection location in said recess for contacting one side of said head near the center thereof; a pair of adjustable members contacting said head on its side opposite said projection such that said members hold said head rigidly within said mount and such that their adjustment pivots said head about said projection thereby changing its azimuth relative to said block.

3. The apparatus of claim 1 in which there is located between the block and the rotatable stepped cam a plurality of ball bearings rotatably mounted in recesses in the block.

4. The apparatus of claim 1, wherein said biasing member comprising a coil-type spring disposed coaxially with said guide means on which said cam is mounted.

5. The apparatus of claim 4, wherein said guide means comprises a guide post, and wherein said spring is telescoped over such post.

References Cited

UNITED STATES PATENTS

| | | | |
|---|---|---|---|
| 2,933,319 | 4/1960 | Proctor | 179—100.2 |
| 3,278,694 | 10/1966 | Pastor et al. | 179—100.2 |
| 2,530,584 | 11/1950 | Pontius | 179—100.2 |
| 2,574,898 | 11/1951 | Von Behren | 179—100.2 |

J. RUSSELL GOUDEAU, *Primary Examiner.*

BERNARD KONICK, *Assistant Examiner.*

U.S. Cl. X.R.

274—4